United States Patent
Soria et al.

(10) Patent No.: US 10,830,176 B2
(45) Date of Patent: Nov. 10, 2020

(54) ADDITIVE MANUFACTURING FIBER-REINFORCED, THRUST REVERSER CASCADE

(71) Applicant: Rohr, Inc., Chula Vista, CA (US)

(72) Inventors: Christian Soria, La Mesa, CA (US); Christopher C. Koroly, Spring Valley, CA (US)

(73) Assignee: Rohr, Inc., Chula Vista, CA (US)

(*) Notice: Subject to any disclaimer, the term of this patent is extended or adjusted under 35 U.S.C. 154(b) by 798 days.

(21) Appl. No.: 14/836,712

(22) Filed: Aug. 26, 2015

(65) Prior Publication Data
US 2017/0057166 A1 Mar. 2, 2017

(51) Int. Cl.
| | |
|---|---|
| *B29C 64/118* | (2017.01) |
| *B29L 31/30* | (2006.01) |
| *F02K 1/56* | (2006.01) |
| *B33Y 80/00* | (2015.01) |
| *F02K 1/70* | (2006.01) |
| *B33Y 10/00* | (2015.01) |
| *B29K 101/12* | (2006.01) |
| *B29K 105/08* | (2006.01) |

(52) U.S. Cl.
CPC ............ *F02K 1/56* (2013.01); *B29C 64/118* (2017.08); *B33Y 80/00* (2014.12); *F02K 1/70* (2013.01); *B29K 2101/12* (2013.01); *B29K 2105/08* (2013.01); *B29L 2031/3076* (2013.01); *B33Y 10/00* (2014.12); *F05D 2230/31* (2013.01); *Y02T 50/60* (2013.01)

(58) Field of Classification Search
None
See application file for complete search history.

(56) References Cited

U.S. PATENT DOCUMENTS

| | | | |
|---|---|---|---|
| 4,067,094 A | 1/1978 | Ittner | |
| 4,596,621 A | 6/1986 | Nawaz | |
| 4,722,821 A | 2/1988 | Vermilye | |
| 4,852,805 A | 8/1989 | Vermilye | |
| 5,342,679 A | 8/1994 | Aochi et al. | |
| 5,576,079 A | 11/1996 | Forman et al. | |
| 6,557,338 B2 | 5/2003 | Holme et al. | |

(Continued)

FOREIGN PATENT DOCUMENTS

| | | |
|---|---|---|
| CN | 103328194 | 9/2013 |
| WO | 2015006485 | 1/2015 |

OTHER PUBLICATIONS

EP search report for EP16185709.9 dated Feb. 14, 2017.
Summons to attend oral proceedings dated Jan. 29, 2019 for Application No. 16185709.9.

*Primary Examiner* — Jeffrey M Wollschlager
*Assistant Examiner* — Armand Melendez
(74) *Attorney, Agent, or Firm* — Getz Balich LLC (57) ABSTRACT

Manufacturing processes is provided for forming a thrust reverser cascade an aircraft propulsion system. The thrust reverser cascade may include an array of vanes connected to and extending laterally between longitudinally extending first and second strongback rails. In one of the processes, the forming of the thrust reverser cascade includes additive manufacturing the first strongback rail and/or at least one of the vanes. This first strongback rail may include a length of fiber which extends more than eighty-five percent of a longitudinal length of the first strongback rail.

19 Claims, 12 Drawing Sheets

(56) References Cited

U.S. PATENT DOCUMENTS

| | | | |
|---|---|---|---|
| 6,725,541 | B1 | 4/2004 | Holme et al. |
| 8,221,087 | B2 | 7/2012 | Schreiber |
| 8,484,944 | B2 | 7/2013 | Urban et al. |
| 9,045,992 | B2 | 6/2015 | Herakles |
| 2007/0210472 | A1 | 9/2007 | D'Inca |
| 2008/0182017 | A1 | 7/2008 | Singh et al. |
| 2012/0189798 | A1 | 7/2012 | Goering |
| 2014/0099476 | A1 | 4/2014 | Subramanian |
| 2014/0120296 | A1 | 5/2014 | Goering |
| 2014/0220295 | A1 | 8/2014 | Goering |
| 2014/0328693 | A1 | 11/2014 | Wilson et al. |
| 2014/0361460 | A1 | 12/2014 | Thomas |
| 2015/0165691 | A1* | 6/2015 | Mark ................. B29C 67/0088 700/98 |
| 2015/0226157 | A1 | 8/2015 | Calder et al. |

* cited by examiner

ADDITIVE MANUFACTURING FIBER-REINFORCED, THRUST REVERSER CASCADE

BACKGROUND OF THE INVENTION

1. Technical Field

This disclosure relates generally to a thrust reverser for an aircraft propulsion system and, more particularly, to methods for forming a cascade for the thrust reverser.

2. Background Information

A typical aircraft propulsion system such as a turbofan turbine engine may include a thrust reverser for redirecting bypass air forward to generate reverse thrust. Several types of thrust reversers are known in the art. Many of these thrust reversers include a cascade array, which provides a series of aerodynamic vanes for redirecting the bypass air in a desired forward direction during reverse thrust operation.

Several methods have been used to manufacture cascades. Some exemplary methods include casting the cascade, machining the cascade, and fastening, welding or brazing cascade components such as vanes and strongback rails together. The foregoing methods, however, are most relevant to metallic cascades. Today, composite cascades are favored for their weight savings versus metallic cascades.

The principal method in use today to manufacture composite cascades utilizes a closed-die or autoclave molding process. Carbon fiber fabric is laid-up in a mold around flexible mandrels that define the open passageways of the cascade. The layup process is generally done by hand and is very labor intensive. The die is closed and compressed to apply consolidation pressure to the fabric layers or the tooling is vacuum bagged and cured in the autoclave under pressure. After molding, the flexible mandrels must be extracted. The process is very expensive and difficult.

There is a need in the art for an improved method for manufacturing a fiber-reinforced composite thrust reverser cascade.

SUMMARY OF THE DISCLOSURE

According to an aspect of the present disclosure, a manufacturing process is provided that includes forming a thrust reverser cascade for an aircraft propulsion system. The thrust reverser cascade includes an array of vanes connected to and extending laterally between longitudinally extending first and second strongback rails. The forming includes additive manufacturing the first strongback rail. The first strongback rail includes a length of fiber which extends more than eighty-five percent of a longitudinal length of the first strongback rail.

According to another aspect of the present disclosure, a manufacturing process is provided that includes forming a thermoplastic thrust reverser cascade. The thrust reverser cascade includes a cascade structure disposed longitudinally between first and second attachments. The cascade structure includes an array of vanes connected to and extending laterally between first and second strongback rails. The forming includes additively manufacturing the cascade structure using thermoplastic material and fiber reinforcement.

According to still another aspect of the present disclosure, a manufacturing process is provided that includes forming a thrust reverser cascade for an aircraft propulsion system. The thrust reverser cascade includes an array of vanes connected to and extending laterally between longitudinally extending first and second strongback rails. The forming includes additive manufacturing a portion of the thrust reverser cascade comprising the first strongback rail and/or at least one of the vanes. The portion of the thrust reverser cascade includes a length of fiber. A first portion of the length of fiber longitudinally overlaps and is laterally next to a second portion of the length of fiber.

The first row of vanes may include a length of fiber which extends more than eighty-five percent of the transverse length of the first vane row.

The length of fiber may be infused within a bead of additive manufacturing matrix material during the additive manufacturing. This additive manufacturing matrix material may be or include thermoplastic material.

The length of fiber may extend substantially the entire longitudinal length of the first strongback rail.

The length of fiber may include a first portion and a second portion that is laterally next to and longitudinally overlaps the first portion.

The forming may include additive manufacturing at least one of the vanes. The length of fiber may extend at least partially into the at least one of the vanes.

The forming may include additive manufacturing at least one of the vanes and the second strongback rail. The length of fiber may extend through the at least one of the vanes and into the second strongback rail.

The additive manufacturing may include additive manufacturing a layer which includes respective portions of the vanes, the first strongback rail and the second strongback rail. The layer may be formed by dispensing a bead of additive manufacturing material which includes the length of fiber.

The additive manufacturing may include additive manufacturing a layer which includes respective portions of the vanes, the first strongback rail and the second strongback rail. The layer may be formed by a plurality of discrete beads of additive manufacturing material.

Each of the beads of additive manufacturing material may include a length of fiber.

The process may include bonding an attach flange to a longitudinal end of at least one of the strongback rails. The attach flange, for example, may be welded, adhered or otherwise bonded to the longitudinal end of at least one of the strongback rails. In addition or alternatively, the attach flange may be mechanically fastened to (e.g., with fastener(s)) or otherwise joined with the longitudinal end of at least one of the strongback rails.

The thrust reverser cascade may include an attach flange disposed at a longitudinal end of the first strongback rail. The forming may include additive manufacturing the attach flange along with the first strongback rail.

The fiber reinforcement may include a length of fiber which is infused within the thermoplastic material during the additive manufacturing.

The length of fiber may extend along a longitudinal length of the cascade structure.

At least a portion of the length of fiber may be within the first strongback rail and/or may extend more than eighty-five percent of a longitudinal length of the first strongback rail.

The length of fiber may include a first portion and a second portion that is laterally next to and longitudinally overlaps the first portion.

The additive manufacturing may include infusing the length of fiber into a bead of thermoplastic material.

The length of fiber may extend within at least one of the vanes.

The length of fiber may extend along a transverse length of the cascade structure.

At least a portion of the length of fiber may be within the first row of vanes and/or may extend more than eighty-five percent (e.g., all) of a transverse length of the first row of vanes.

The foregoing features and the operation of the invention will become more apparent in light of the following description and the accompanying drawings.

DETAILED DESCRIPTION OF THE INVENTION

Figure 1:
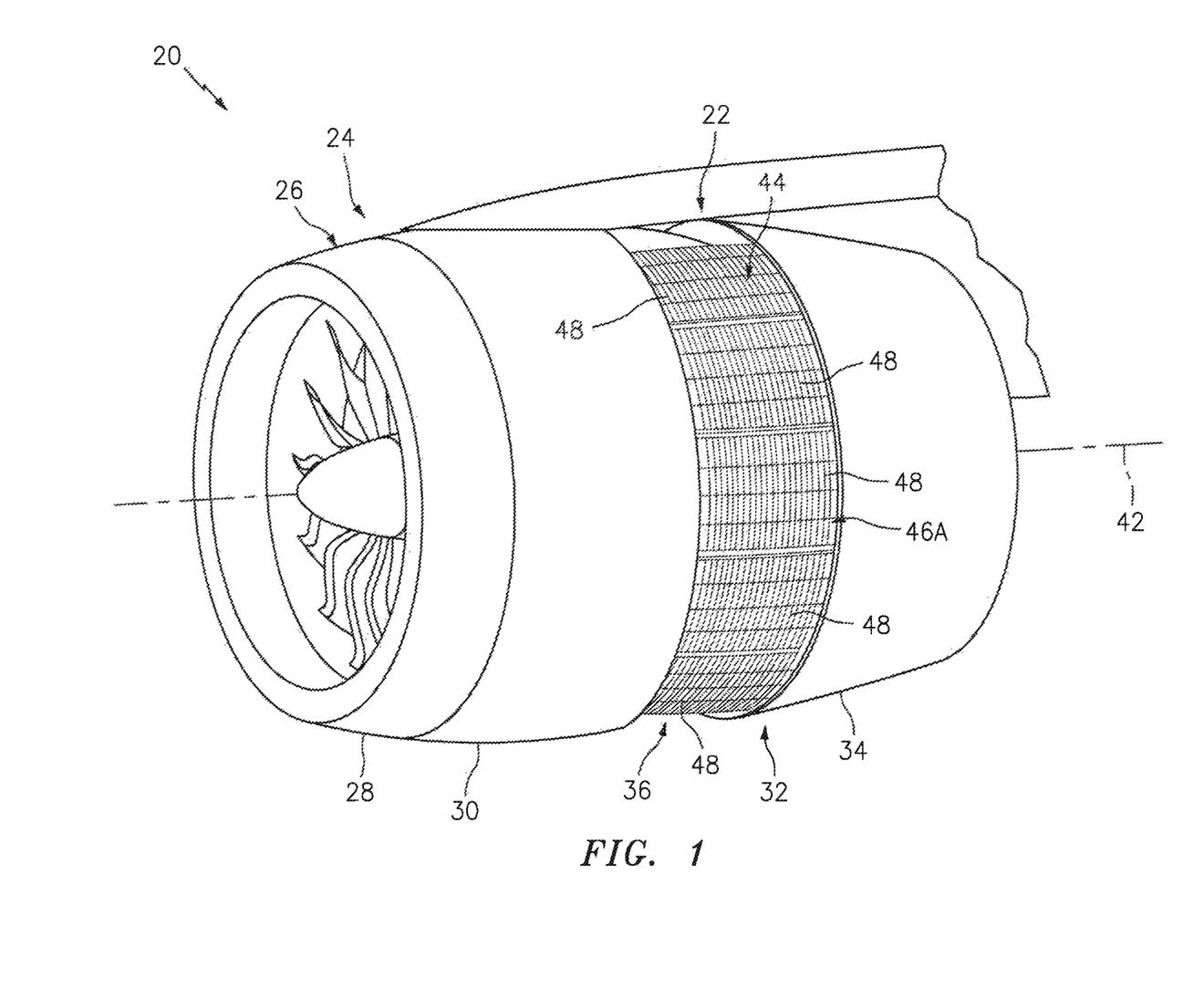
FIG. 1 is a perspective illustration of an aircraft propulsion system with its thrust reverser in a deployed configuration.

The present disclosure includes methods for manufacturing one or more cascades for a thrust reverser of an aircraft propulsion system, which may include and may be powered by a gas turbine engine such as a turbofan engine or a turbojet engine. An exemplary embodiment of such a propulsion system 20 and such a thrust reverser 22 is illustrated in FIG. 1. The methods of the present disclosure, of course, may also be utilized to manufacture thrust reverser cascades for different propulsion systems and cascades of different types and configurations other than those described below and illustrated in the drawings.

Figure 2:
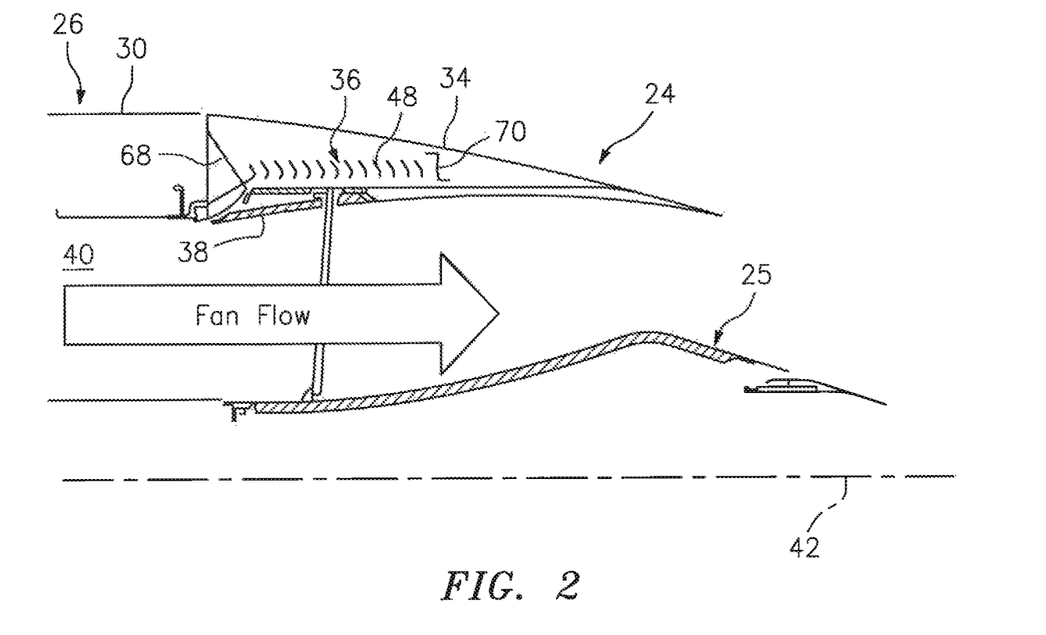
FIG. 2 is a side sectional illustration of an aft portion of the aircraft propulsion system with its thrust reverser in a stowed configuration.
Figure 3:
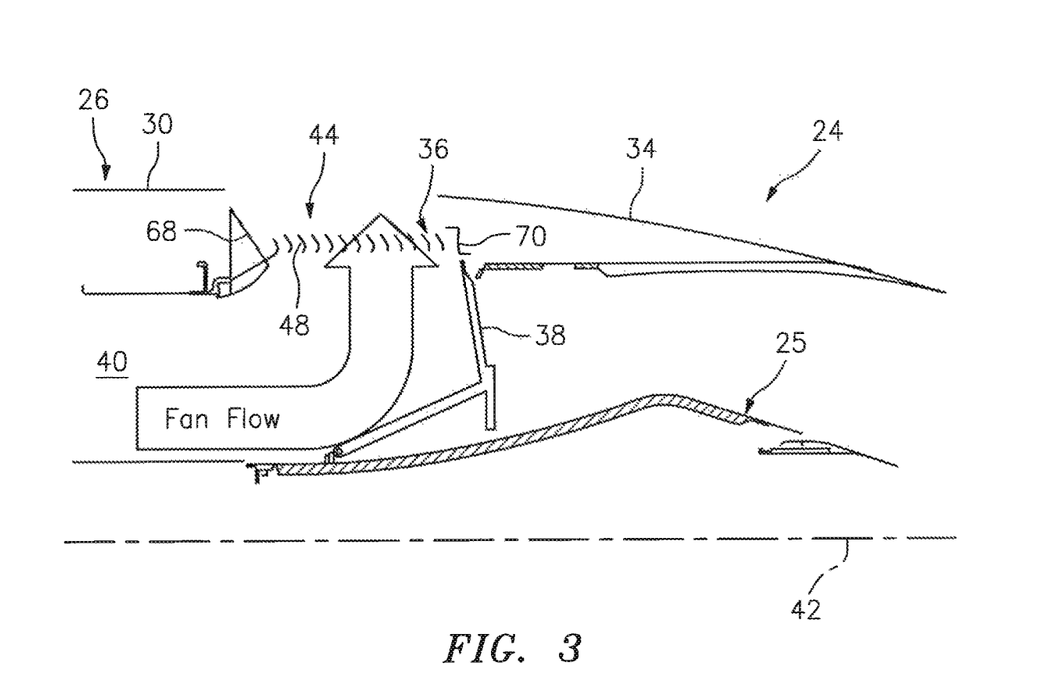
FIG. 3 is a side sectional illustration of the aft portion of the aircraft propulsion system with its thrust reverser in the deployed configuration.

The propulsion system 20 of FIG. 1 includes an outer (e.g., fan bypass) nacelle structure 24 and an inner (e.g., core) nacelle structure 25 (see FIGS. 2 and 3). This inner nacelle structure 25 may be referred to as an inner fixed structure (IFS). The inner nacelle structure 25 houses and is configured to provide an aerodynamic cover for a core of the gas turbine engine.

Referring still to FIG. 1, the outer nacelle structure 24 includes a stationary forward module 26, which may include a nacelle inlet 28 and a fan cowling 30. The outer nacelle structure 24 also includes an aft thrust reverser module 32, which includes a translating sleeve 34 and a thrust reverser cascade array 36. Referring to FIGS. 2 and 3, the thrust reverser module 32 may also include one or more blocker doors 38 configured to deploy and direct air from a bypass flowpath 40 of the propulsion system 20 into the cascade array 36 during thrust reverser 22 deployment.

Figure 4:
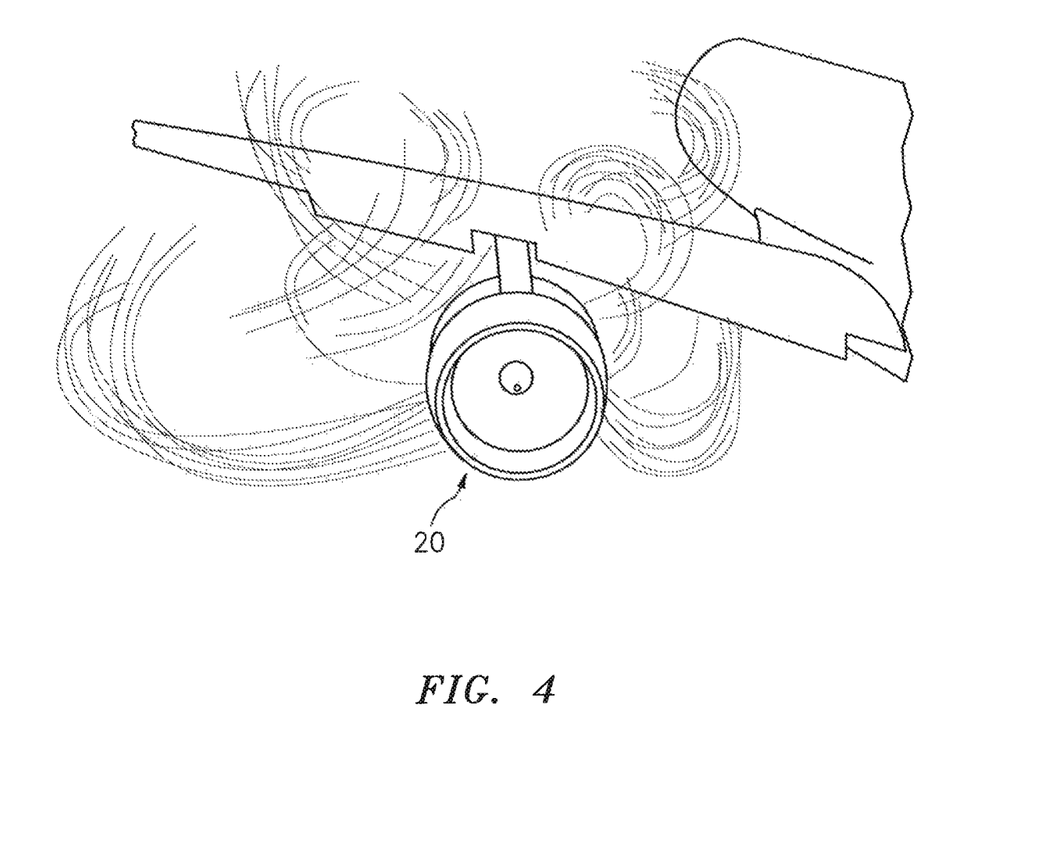
FIG. 4 is another perspective illustration of the aircraft propulsion system with its thrust reverser in the deployed configuration as well as general exemplary flowpaths of air directed out of the thrust reverser.

The translating sleeve 34 is configured to translate axially aft along an axial centerline 42 of the propulsion system 20 in order to expose the cascade array 36 and open a thrust reverser flowpath 44 (see FIG. 3). This thrust reverser flowpath 44 receives bypass air from the bypass flowpath 40, and directs this air through the cascade array 36 which redirects that air in a radially outward and axially forward direction. The cascade array 36 may also redirect the air in a circumferential direction in order to, for example, direct the air away from the runway and/or wings as illustrated in FIG. 4. The translating sleeve 34 is also configured to translate axially forward along the centerline 42 in order to cover the cascade array 36 and close the thrust reverser flowpath 44 (see FIG. 2).

Referring again to FIG. 1, the cascade array 36 may include one or more sub-arrays 46. The cascade array 36 of FIG. 1, for example, include first and second sub-arrays 46, where the second sub-array 46B is substantially diametrically opposed from the first sub-array 46A and therefore hidden in FIG. 1. Each of these sub-arrays 46 includes one or more thrust reverser cascades 48 arranged circumferentially around the centerline 42.

Figure 5:
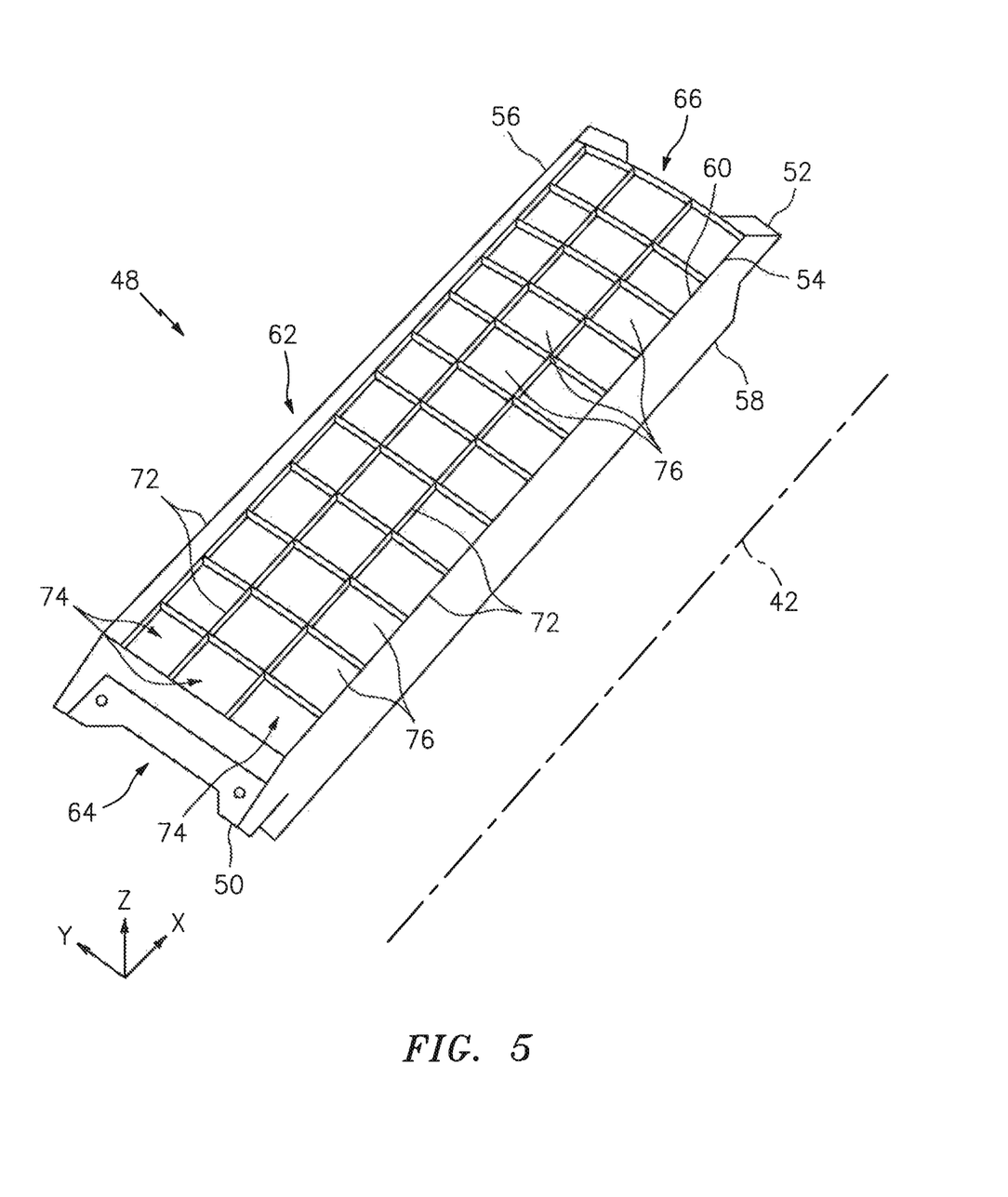
FIG. 5 is a perspective illustration of a thrust reverser cascade for the thrust reverser.

FIG. 5 illustrates an exemplary one of the thrust reverser cascades 48. This cascade 48 extends longitudinally (e.g., along x-axis and generally parallel with the centerline 42) between opposing cascade ends 50 and 52. The cascade 48 extends laterally (e.g., along y-axis and generally circumferentially around or tangent to the centerline 42) between opposing cascade sides 54 and 56. The cascade 48 also extends transversely (e.g., along z-axis and generally radially relative to the centerline 42) between opposing inner and outer sides 58 and 60.

The cascade 48 of FIG. 5 includes a base cascade structure 62 and one or more attachments 64 and 66; e.g., mounting structures. Each of these attachments 64 and 66 is configured to attach/mount the cascade structure 62 to another structure of the propulsion system 20 such as, but not limited to, a torque box 68 or an aft cascade ring 70 (see FIGS. 2 and 3). The attachments 64 and 66 of FIG. 5, for example, are configured as attachment flanges with apertures for receiving fasteners; e.g., bolds, rivets, etc.

Figure 6:
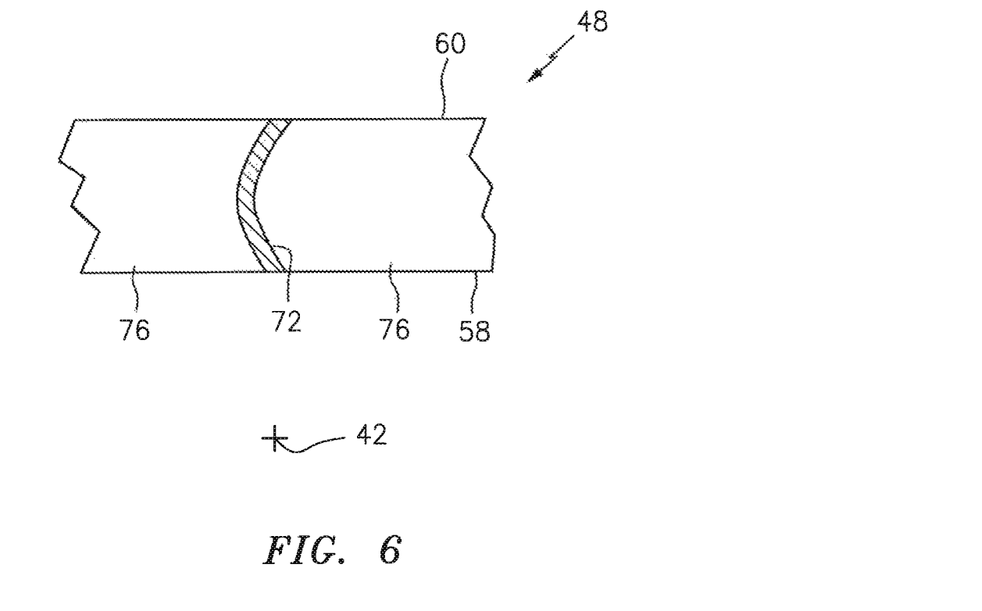
FIG. 6 is a cross-sectional illustration of a portion of an embodiment of the thrust reverser cascade.
Figure 7:
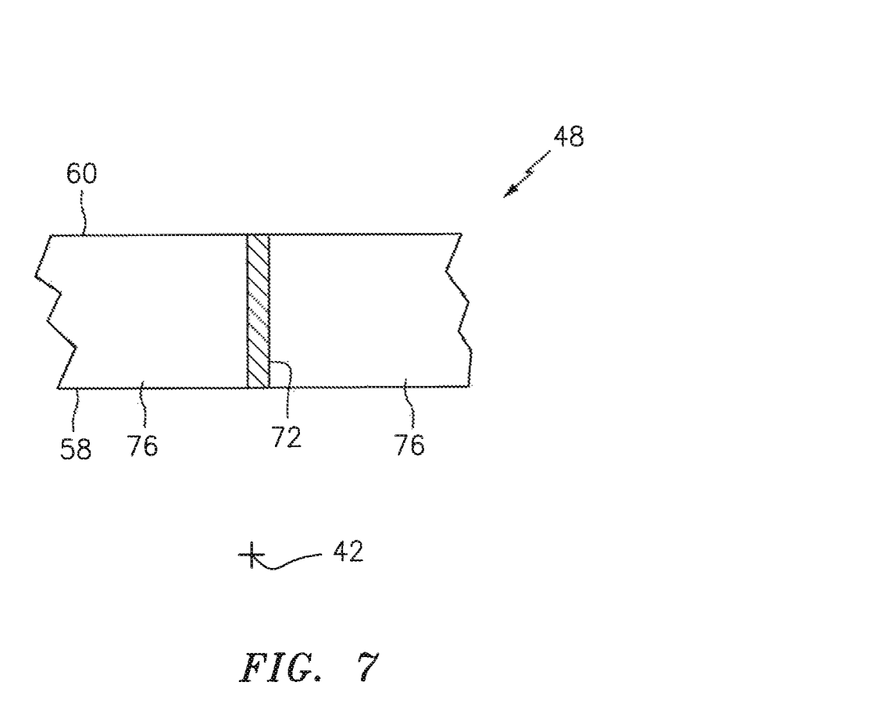
FIG. 7 is a cross-sectional illustration of a portion of another embodiment of the thrust reverser cascade.

The cascade structure 62 includes a plurality of strongback rails 72 and one or more arrays 74 of cascade vanes 76. The strongback rails 72 are arranged generally parallel with one another, and extend substantially longitudinally between the cascade ends 50 and 52. One or more of the strongback rails 72 (e.g., the laterally exterior rails) may extend into/configured with one or more of the attachments 64 and 66. One or more of the strongback rails 72 (e.g., the laterally interior rails) may extend to one or more of the attachments 64 and 66. Referring to FIG. 6, each of the strongback rails 72 may have a non-linear (e.g., curved) cross-sectional geometry in order to redirect air flowing through the cascade 48 in the circumferential direction. Alternatively, referring to FIG. 7, one or more of the strongback rails 72 may each have a linear (e.g., straight) cross-sectional geometry.

Figure 8:
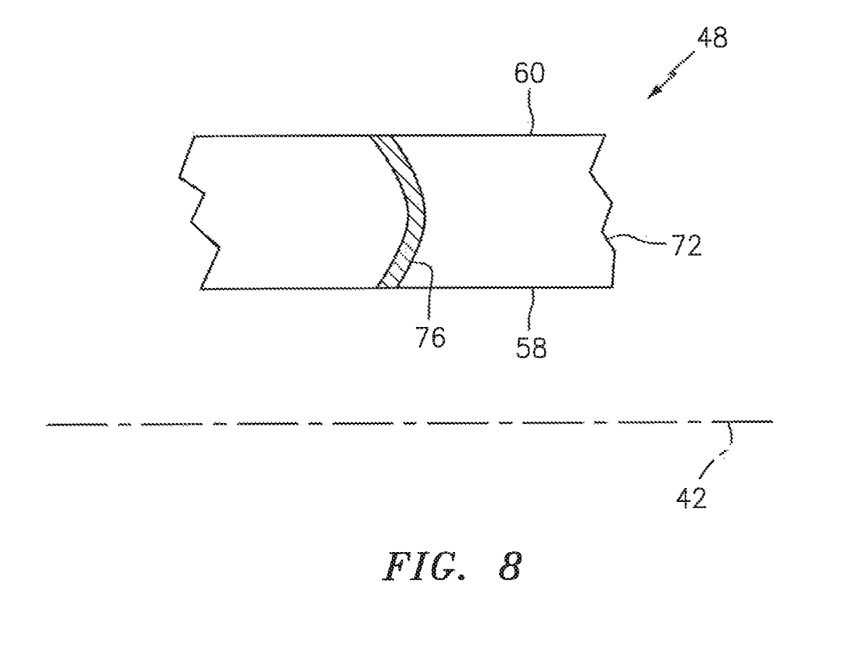
FIG. 8 is a side sectional illustration of a portion of an embodiment of the thrust reverser cascade.
Figure 9:
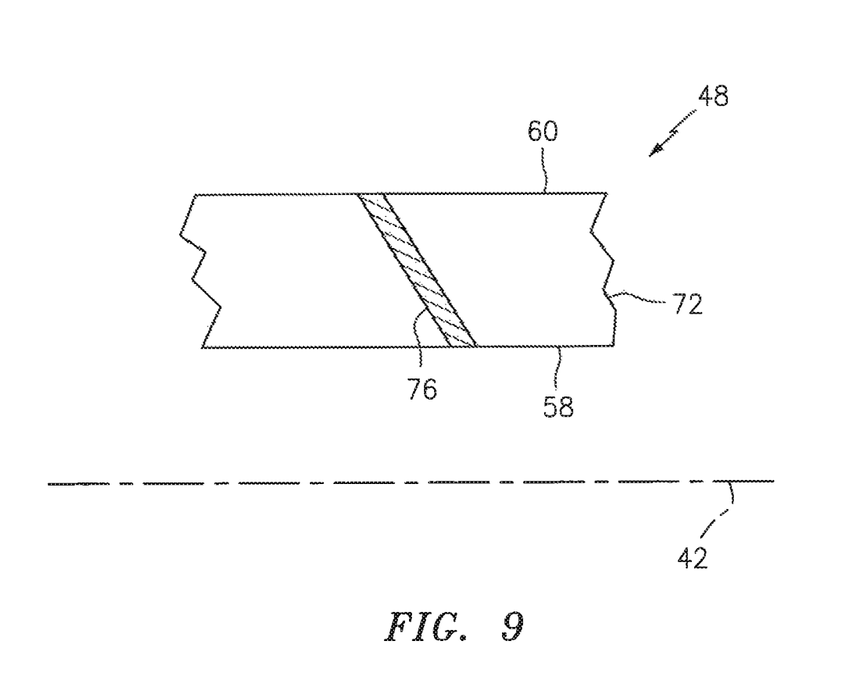
FIG. 9 is a side sectional illustration of a portion of another embodiment of the thrust reverser cascade.

Referring again to FIG. 5, the arrays 74 of cascade vanes 76 are respectively arranged between laterally adjacent strongback rails 72. Each of the arrays 74 of cascade vanes 76 includes a plurality of the cascade vanes 76, which are disposed at discrete locations along the longitudinally length of the strongback rails 72. Each of the cascade vanes 76 extends laterally between and is connected to (e.g., bonded to or formed integral with) a respective adjacent set of the strongback rails 72. Referring to FIG. 8, each of the cascade vanes 76 may have a non-linear (e.g., curved) cross-sectional geometry in order to redirect air flowing through the cascade 48 in the axial direction. Alternatively, referring to FIG. 9, one or more of the cascade vanes 76 may each have a linear (e.g., straight) cross-sectional geometry.

As described below in further detail, the entire cascade 48 or at least a portion thereof may be additively manufactured (e.g., 3D printed) using fiber reinforcement within additive manufacturing matrix material; e.g., thermoplastic material. Examples of the fiber reinforcement material include, but are not limited to, fiberglass material, carbon fiber material and/or aramid (e.g., Kevlar®) material. The fiber material includes one or more continuous lengths of fiber. These lengths of fiber may have different lengths depending upon where they are positioned within the cascade 48. However, in general, at least some of the lengths of fiber in the strongback rails 72 have length which are at least about eighty-five percent (85%) of a longitudinal length of that rail 72, and in some embodiments at least substantially the entire longitudinal length (e.g., 100%+/−1%) of that rail 72. Of course, in other embodiments, the lengths of these fibers may be more or less than in the exemplary embodiments described above. For example, in some embodiments, the fibers in the cascade vanes 76 may be chopped fibers or relatively short long fibers.

Figure 10:
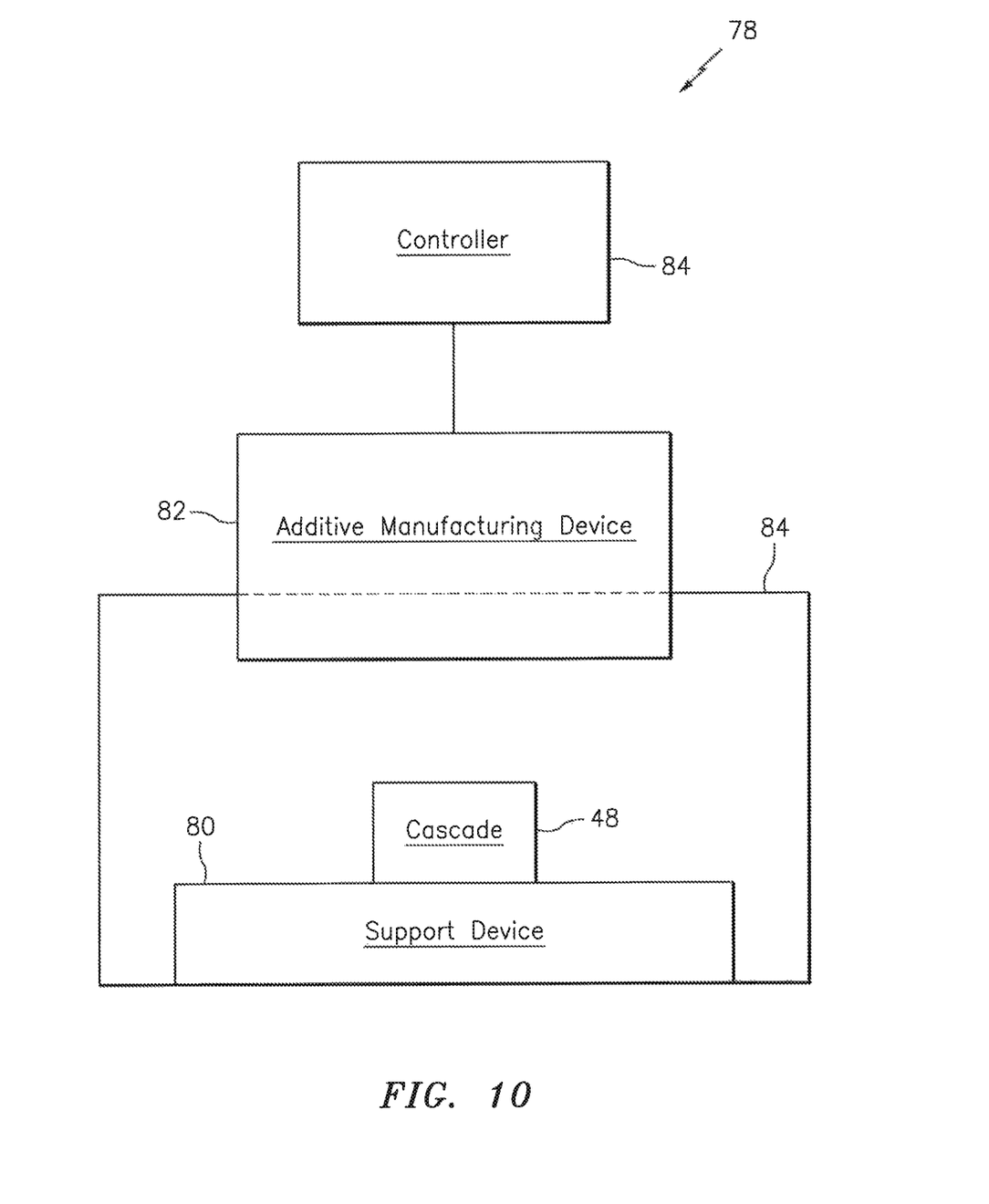
FIG. 10 is a block diagram of a system for forming a thrust reverser cascade.

FIG. 10 illustrates a system 78 for manufacturing a thrust reverser cascade such as the cascade 48 of FIG. 5. This system 78 includes a support device 80, an additive manufacturing device 82 (e.g., a 3D printer system) and a controller 84, which is in signal communication with the device 82. The system 78 may also include a housing 84 in which the cascade 48 is to be formed.

The additive manufacturing device 82 is configured to additively manufacture (e.g., 3D print) the entire cascade 48, or a portion of the cascade 48 such as the cascade structure 62 and/or the attachments 64 and 66, on the support device 80. The additive manufacturing device 82, for example, may be configured to infuse a length of fiber (or fibers) into additive manufacturing matrix material and subsequently dispose that infused material (e.g., in the form of a bead) to build a layer of the cascade 48. An example of such an additive manufacture device is the Mark One Composite 3D printer, which is sold by MarkForged, Inc. of Somerville, Mass., United States. Other examples of such an additive manufacture device are disclosed in U.S. Publication No. 2015/0165691 and U.S. Publication No. 2014/0328963, each of which are hereby incorporated herein by reference in its entirety. However, the present disclosure is not limited to utilizing any particular additive manufacturing device type or configuration.

Figure 11:
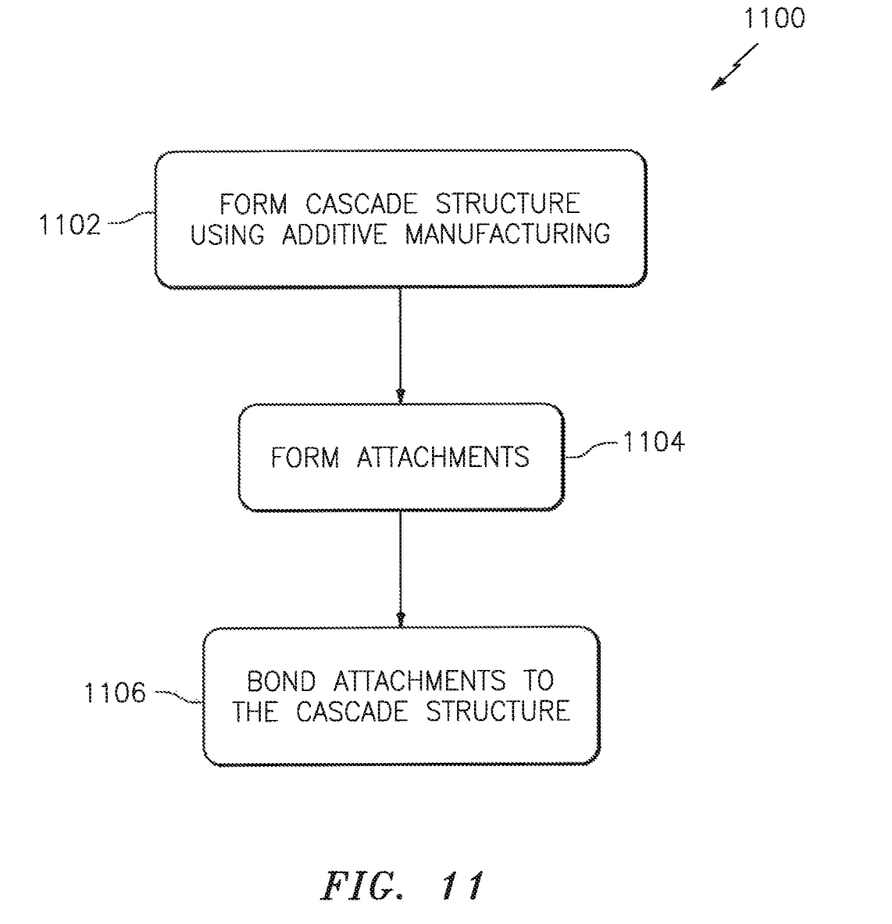
FIG. 11 is a block diagram of a method for forming a thrust reverser cascade.

FIG. 11 is a flow diagram of a method 1100 for forming a thrust reverser cascade. This method 1100 is described below with reference to building the thrust reverser cascade 48. The method 1100 is also described below with reference to using the system 78. The method of FIG. 11, however, may alternatively be used to form thrust reverser cascades other than the one described above. In addition, the method of FIG. 11 may be used to form a thrust reverser cascade using a system other than the one described above.

In step 1102, the cascade structure 62 is formed using the additive manufacturing device 82. In particular, the additive manufacturing device 82 is operated to additively manufacture (e.g., 3D prints) the cascade structure 62 in a layer-by-layer fashion using at least one bead of additive manufacturing material. The bead of additive manufacturing material includes the fiber reinforcement material with the additive manufacturing matrix material. For example, the bead of additive manufacturing material includes at least one length of fiber infused within thermoplastic material. This fiber may be a single strand of fiber or a plurality of strands of fibers grouped (e.g., laid, braided, wound, etc.) together. Note, subsequent layers of additive manufacturing material may be cured and/or consolidated to one another as they are being deposited/printed on a previous deposited/printed layer.

Figure 12:
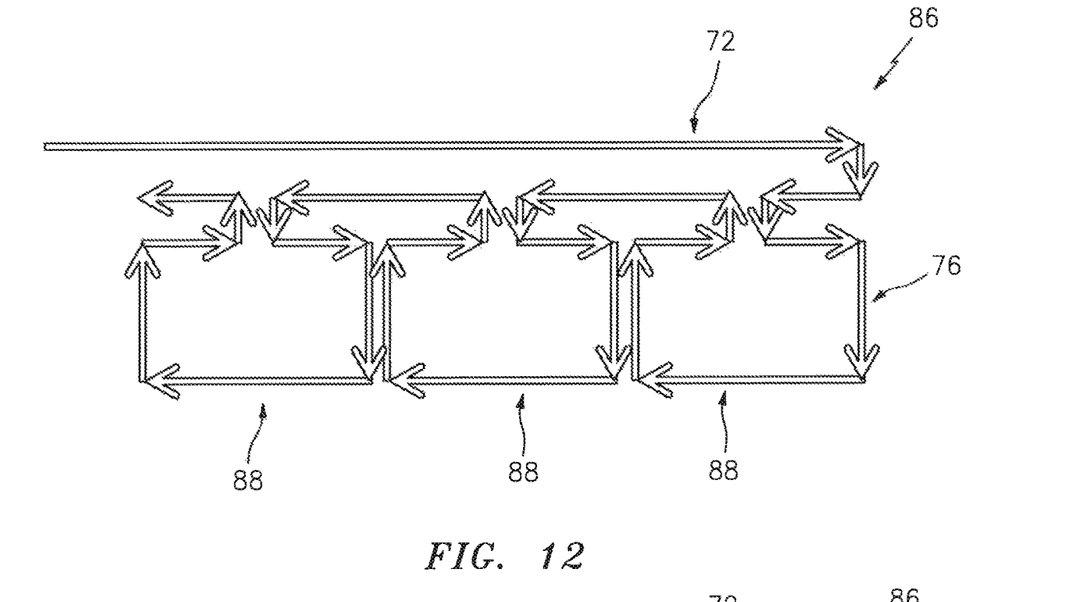
FIG. 12 is a pattern for additively manufacturing a layer of a portion of the thrust reverser cascade.
Figure 13:
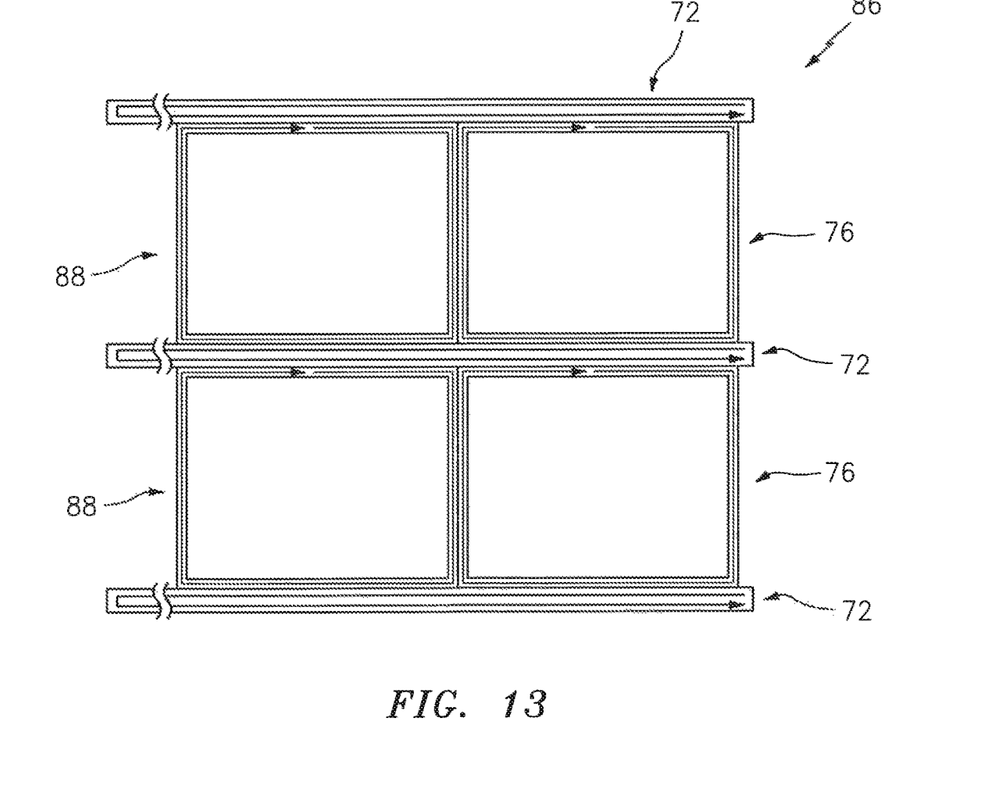
FIG. 13 is another pattern for additively manufacturing a layer of a portion of the thrust reverser cascade.
Figure 14:
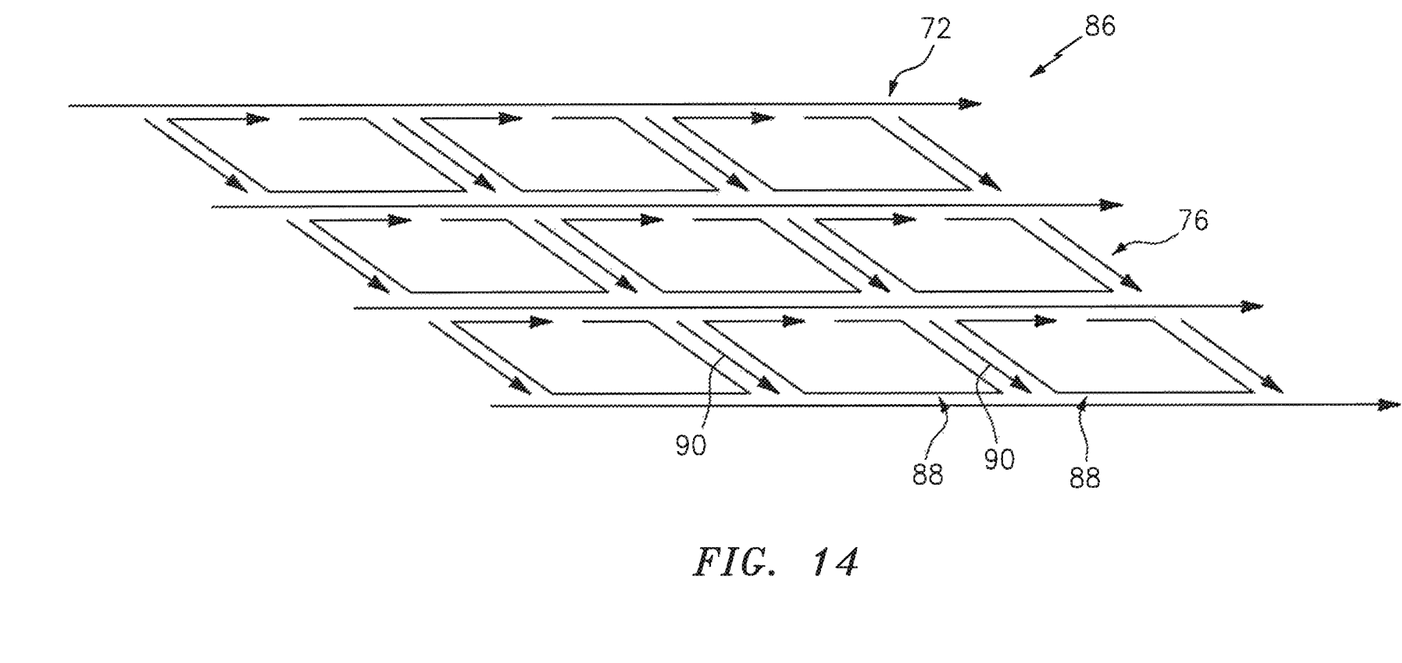
FIG. 14 is yet another pattern for additively manufacturing a layer of a portion of the thrust reverser cascade.
Figure 15:
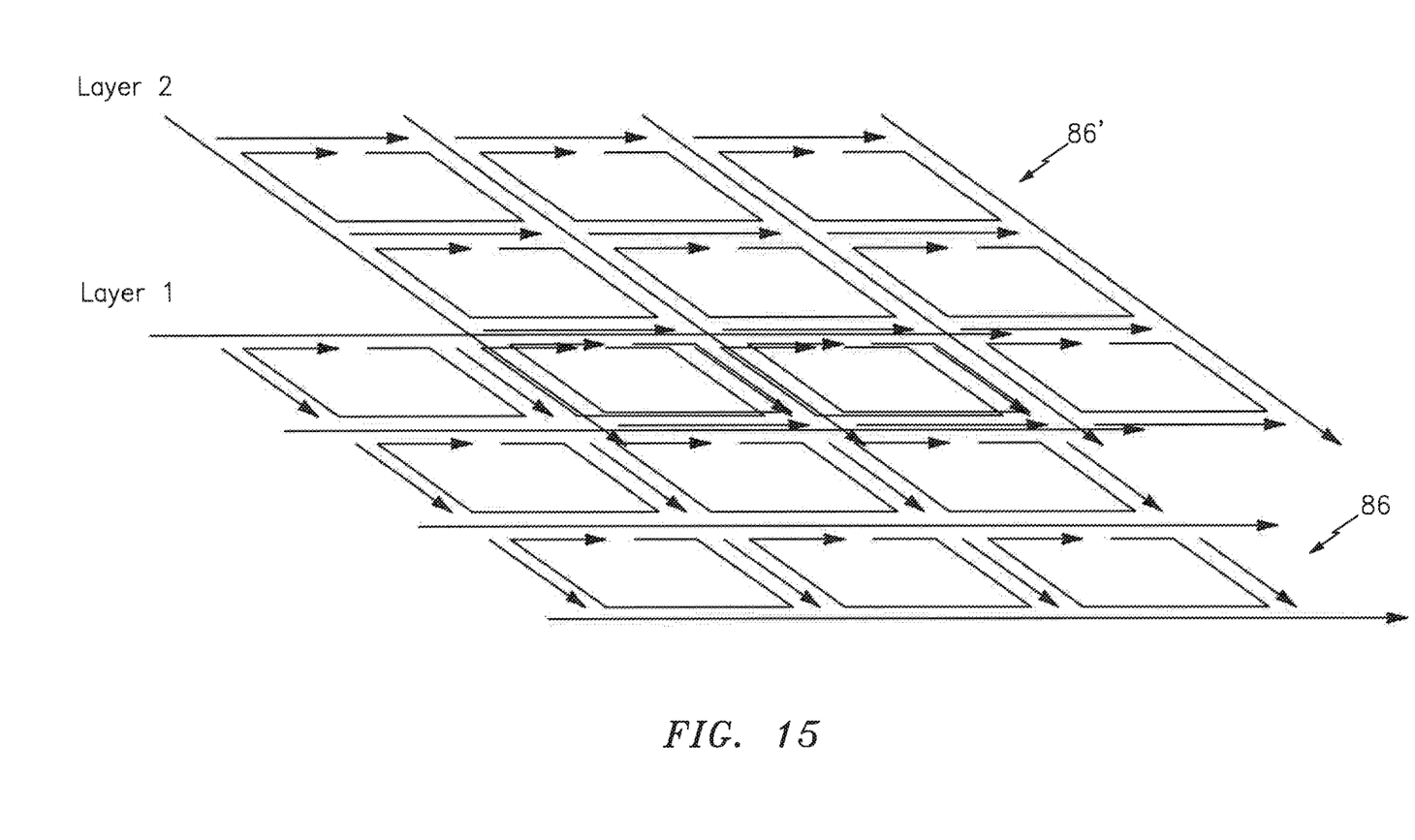
FIGS. 15 and 16 illustrate patterns for additively manufacturing adjacent layers of a portion of the thrust reverser cascade.
Figure 16:
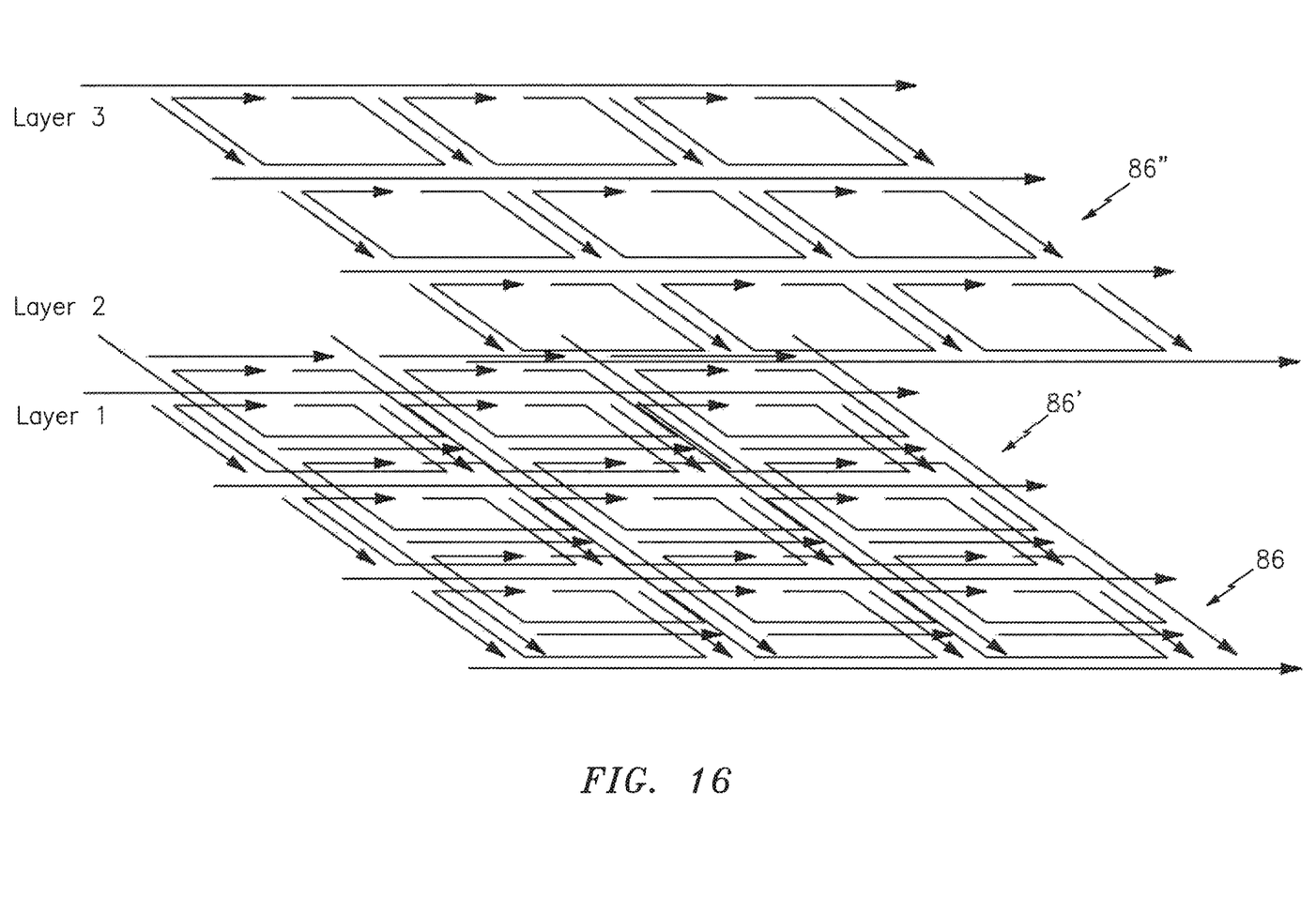

The additive manufacturing device 82 may be operated to form each layer of the cascade structure 62 using the same general pattern. Alternatively, the additive manufacturing device 82 may be operated to form the layers using different and/or alternating patterns in order, for example, for fibers in the different layers to overlap one another in different fashions; e.g., in a transverse fashion. For example, a pattern used to form one layer may be generally rotated ninety degrees (or another degree of rotation) in the subsequent layer such that the fibers deposited in the first layer are transverse to and overlapping the fibers deposited in the second layer; e.g., see FIGS. 15 and 16. Exemplary patterns for forming at least one layer of the cascade structure 62 are illustrated in FIGS. 12, 13 and 14. Of course, one or more of the layers may be additively manufactured using one or more other patterns.

In the pattern of FIG. 12, at least one full longitudinal pass is made to form a portion of one of the strongback rails 72 in the layer 86. In this manner, at least a portion of the fiber in the strongback rail 72 in the layer 86 may extend most (e.g., more than 85%) or substantially all of the longitudinal length of that rail 72. Thereafter, discrete cascade baskets 88 may be iteratively formed in the layer to form the cascade vanes 76 as well as a remaining portion of the already partially formed strongback rail 72 in that layer 86. This pattern may then be repeated to form another strongback rail 72 as well as another array 74 of the cascade vanes 76 in the layer 86. In this manner, the same infused length of fiber may run through the entire layer 86. However, in alternative embodiments, the layer 86 may include a plurality of end-to-end lengths of fiber depending upon the design requirements for the cascade 48 and/or the available length of fiber in a supply spool.

In the pattern of FIG. 13, one or more full longitudinal passes are made to form a portion of one of the strongback rails 72 in the layer 86. In this manner, at least a portion of the infused length of fiber in the strongback rail 72 in the layer 86 may extend most (e.g., more than 85%) or substantially all of the longitudinal length of that rail 72. Thereafter, discrete cascade baskets 88 may be iteratively formed in the layer 86 to form the cascade vanes 76 as well as a remaining portion of the already partially formed strongback rail 72 in that layer 86. However, in contrast to the pattern of FIG. 12, each of the cascade baskets 88 in the layer 86 is formed with its own length of fiber. Of course, in other embodiments, one or more of the cascade baskets 88 in the layer 86 may be formed with chopped fiber or without fiber reinforcement. This pattern may then be repeated to form another strongback rail 72 as well as another array 74 of the cascade vanes 76 in the layer 86. It is worth noting, the pattern of FIG. 13 may enable the strongback rails 72 to include longer fiber lengths (e.g., more full length fiber passes) as compared to the pattern of FIG. 12, which can further enhance the strength and durability of the strongback rails 72.

In the pattern of FIG. 14, the layer 86 is deposited such that layers are printed with unidirectional fibers (e.g., direction of element 90) running in a transverse direction while maintaining constant thickness for each layer 86. The print pattern may include cut tape as shown by beginning and termination of arrows or may be a continuous bead deposited in such a manner to prevent material from stacking up at intersecting points. A "stack up" may describe an undesirable condition where two or more layers of material are printed or deposited in a single layer 86. In order for a stack up to be at the correct height for the layer, the fiber volume in the matrix material may be raised to an undesired level in non-stacked regions and/or conversely the resin content may be lowered in the stacked region(s) to allow the stack up layers to reach the desired layer 86 thickness.

In the embodiments described above and illustrated in FIGS. 12, 13 and 14, at least one portion of the infused length of fiber may be laterally next to and longitudinally overlap another portion of the fiber. However, in other embodiments, the fiber may be cut or placed end-to-end with another fiber so that the same fiber does not (e.g., longitudinally) overlap within the same layer 86.

In the embodiments described above and illustrated in FIGS. 12, 13 and 14, one or more additional layers of additive manufacturing material with or without fiber reinforcement material may be deposited/printed in order to provide material buildup. Such a buildup technique may be used to buildup/thicken/reinforce one or more discrete portions of the thrust reverser cascade 48. In addition or alternatively, one or more additional beads of additive manufacturing material may be deposited/printed within a layer to build up one or more portions of that layer; e.g., see element 90 in FIG. 14.

In step 1104, one or more of the attachments 64 and 66 are formed (see FIG. 5). One or more of the attachments 64 and 66 may be formed, for example, using the additive manufacturing device 82 in a layer-by-layer fashion. In another example, one or more of the attachments 64 and 66 may also or alternatively be formed using one or more other techniques. These techniques may include, but are not limited to, one or more of the following: injection molding, compression molding, thermoforming, vacuum forming and autoclave curing. One or more of the attachments 64 and 66 may be formed from a polymer such as thermoplastic material or thermoset material as well as with or without fiber-reinforcement.

In step 1106, the attachments 64 and 66 are bonded to the cascade structure 62 (see FIG. 5). Each attachment 64, 66, for example, may be bonded to a respective end 50, 52 of the cascade structure 62 using any suitable bonding technique. Such bonding techniques include, but are not limited to, ultrasonic welding, resistance welding, adhesion, etc. Of course, in other embodiments, one or more of the attachments 64 and 66 may be formed along with the cascade structure 62 during the additive manufacturing step such that the attachment(s) 64, 66 is/are formed integrally with the cascade structure 62.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

We claim:

1. A manufacturing process, comprising: forming a thrust reverser cascade for an aircraft propulsion system using an additive manufacturing device; the thrust reverser cascade including an array of vanes connected to and extending laterally between longitudinally extending first and second strongback rails; wherein the forming includes additive manufacturing the first strongback rail; wherein the first strongback rail includes a length of fiber which extends more than eighty-five percent of a longitudinal length of the first strongback rail; wherein the additive manufacturing device is operated to form layers of the thrust reverser cascade; and wherein, during formation of a first of the layers of the thrust reverser cascade, the additive manufacturing device is operated to dispose the length of fiber to sequentially form a first portion of the first strongback rail that extends more than eighty-five percent of the longitudinal length of the first strongback rail by making at least one longitudinal pass; and a plurality of cascade baskets one-by-one along the first portion of the first strongback rail, wherein the cascade baskets form portions of the vanes and a second portion of the first strongback rail located laterally between the first portion of the first strongback rail and the portions of the vanes, and each of the plurality of cascade baskets is formed in a clockwise or a counter clockwise pattern.

2. The manufacturing method of claim 1, wherein the length of fiber is infused within a bead of additive manufacturing matrix material during the additive manufacturing.

3. The manufacturing method of claim 2, wherein the additive manufacturing matrix material comprises thermoplastic material.

4. The manufacturing process of claim 1, wherein the length of fiber extends substantially the entire longitudinal length of the first strongback rail.

5. The manufacturing process of claim 1, wherein
    the length of fiber includes a first portion and a second portion that is laterally next to and longitudinally overlaps the first portion; and
    the first portion of the length of fiber and the second portion of the length of fiber are included in the first strongback rail.

6. The manufacturing process of claim 1, further comprising bonding an attach flange to a longitudinal end of at least one of the strongback rails.

7. The manufacturing process of claim 1, wherein
    the thrust reverser cascade further includes an attach flange disposed at a longitudinal end of the first strongback rail; and
    the forming further includes additive manufacturing the attach flange along with the first strongback rail.

8. The manufacturing process of claim 1, wherein, during formation of the first of the layers of the thrust reverser cascade, the additive manufacturing device is further operated to dispose the length of fiber to sequentially form
    a first portion of the second strongback rail that extends more than eighty-five percent of the longitudinal length of the second strongback rail by making at least one longitudinal pass; and a plurality of second cascade baskets one-by-one along the first portion of the second strongback rail, wherein the second cascade baskets form portions of a plurality of second vanes and a second portion of the second strongback rail located laterally between the first portion of the second strongback rail and the portions of the second vanes.

9. The manufacturing process of claim 1, wherein, during the formation of a first of the cascade baskets, the additive manufacturing device is operated to dispose the length of fiber to follow a path that sequentially includes
 a first segment extending in a first longitudinal direction;
 a second segment extending in a second longitudinal direction that is different than the first longitudinal direction;
 a third segment extending in a first lateral direction;
 a fourth segment extending in the first longitudinal direction;
 a fifth segment extending in a second lateral direction that is different than the first lateral direction;
 a sixth segment extending in the second longitudinal direction; and
 a seventh segment extending in the first longitudinal direction.

10. The manufacturing process of claim 1, wherein the additive manufacturing device is operated to form the layers of the thrust reverser cascade using alternating patterns such that fibers in different layers overlap one another in different fashions.

11. A manufacturing process, comprising: forming a thrust reverser cascade for an aircraft propulsion system using an additive manufacturing device; the thrust reverser cascade including an array of vanes connected to and extending laterally between longitudinally extending first and second strongback rails; wherein the forming includes additive manufacturing the first strongback rail; wherein the first strongback rail includes a first length of fiber which extends more than eighty-five percent of a longitudinal length of the first strongback rail; wherein the additive manufacturing device is operated to form layers of the thrust reverser cascade; and wherein, during formation of a first of the layers of the thrust reverser cascade, the additive manufacturing device is operated to form a first portion of the first strongback rail using the first length of fiber; and a plurality of cascade baskets, the plurality of cascade baskets comprising a first cascade basket that is formed using a second length of fiber, wherein the first cascade basket forms a portion of a first of the vanes, a portion of a second of the vanes and a second portion of the first strongback rail, and wherein each of the plurality of cascade baskets is formed in a clockwise or a counter clockwise pattern.

12. The manufacturing process of claim 11, wherein the plurality of cascade baskets further comprises a second cascade basket; during the formation of the first of the layers of the thrust reverser cascade, the additive manufacturing device is further operated to form the second cascade basket using a third length of fiber; and the second cascade basket forms a portion of the second of the vanes, a portion of a third of the vanes and a third portion of the first strongback rail.

13. The manufacturing process of claim 11, wherein the additive manufacturing device is operated to form the layers of the thrust reverser cascade using alternating patterns such that fibers in different layers overlap one another in different fashions.

14. The manufacturing method of claim 11, wherein the length of fiber is infused within a bead of additive manufacturing matrix material during the additive manufacturing.

15. The manufacturing method of claim 14, wherein the additive manufacturing matrix material comprises thermoplastic material.

16. The manufacturing process of claim 11, wherein the length of fiber extends substantially the entire longitudinal length of the first strongback rail.

17. The manufacturing process of claim 11, wherein
 the length of fiber includes a first portion and a second portion that is laterally next to and longitudinally overlaps the first portion; and
 the first portion of the length of fiber and the second portion of the length of fiber are included in the first strongback rail.

18. The manufacturing process of claim 11, further comprising bonding an attach flange to a longitudinal end of at least one of the strongback rails.

19. The manufacturing process of claim 11, wherein
 the thrust reverser cascade further includes an attach flange disposed at a longitudinal end of the first strongback rail; and
 the forming further includes additive manufacturing the attach flange along with the first strongback rail.

* * * * *